UNITED STATES PATENT OFFICE.

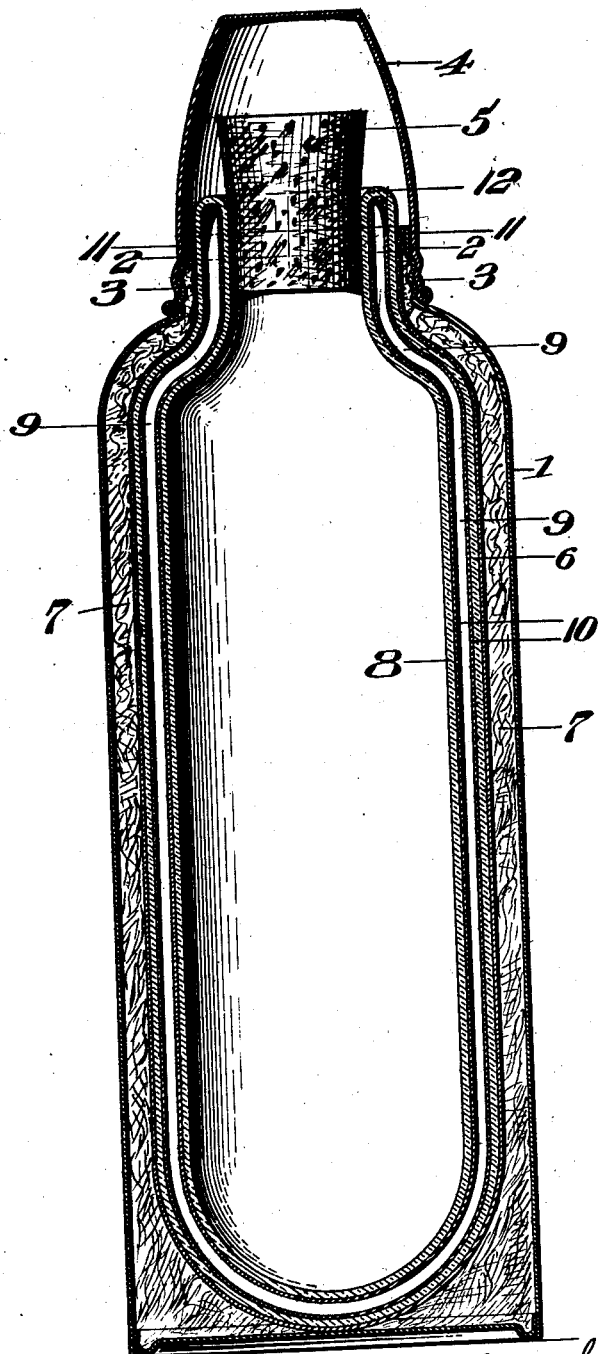

JOHN G. LYMAN, OF PHILADELPHIA, PENNSYLVANIA.

VACUUM-BOTTLE.

No. 922,174.　　　Specification of Letters Patent.　　Patented May 18, 1909.

Application filed August 18, 1908. Serial No. 449,027.

To all whom it may concern:

Be it known that I, JOHN G. LYMAN, a citizen of the United States, residing in the city and county of Philadelphia, State of Pennsylvania, have invented a new and useful Vacuum-Bottle, of which the following is a specification.

This invention relates to a new and useful receptacle for storing liquids so that the temperature of the same may be maintained substantially constant for a long period of time and the effectiveness of the receptacle be substantially unimpaired after long continued use.
It has for an object, to provide a receptacle of this type with a suitable discharge opening which is so arranged relative to adjacent parts as to prevent at any time, the contents of the receptacle from coming in contact with the insulating means inclosing the said receptacle.

It has for a further object, a novel arrangement of mouth opening for a receptacle operating on the vacuum principle, wherein a joining ring is located around the neck of the bottle in such a position that it does not form a collecting place for overflowing contents of the receptacle and the gathering of disease germs.
For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

The figure represents a sectional elevation of a receptacle embodying my invention.

Similar numerals of reference indicate corresponding parts in the figures.

Referring to the drawings: 1 designates a casing for a receptacle embodying my invention, the same preferably being of metal or other suitable material and having a neck 2 formed therein and provided with a thread 3 to receive the threaded end of a cap 4 designed to inclose a cork 5 or other closing means removably located in the neck opening of the receptacle.
6 designates the outer shell of a receptacle within the casing 1 the same being protected from contact with the walls of the casing and relative displacement by means of suitable material 7 therebetween. The material is preferably a non-conductor of heat or cold and serves to maintain the contents of the receptacle at a substantially constant temperature—thus if the receptacle is filled with a liquid at a temperature approximating the boiling point, the material will resist the escape of any heat units. In the same manner the receptacle maintains the contents at a low temperature.

8 designates the inner wall of the same receptacle and is of similar contour to the outer shell 6 but located at a slight distance therefrom in order to provide a chamber 9 therebetween from which, in order to make an operative receptacle of the type to which my invention relates, the air is exhausted from the said space 9 forming a vacuum and a lining 10 is preferably provided within the same of quick silver or similar material. Of course, it will be understood by those skilled in the art that the insulating material 7 between the outer shell 6 and the casing 1 has to be securely sealed therein in order to prevent water or liquids leaking into this space and destroying in a large measure, the insulating effect of this material. For this purpose in the present instance, I employ a plaster-of-paris joining ring 11, located between the neck 3 of the casing 1 and the outer wall 6 of the liquid receptacle. It will be noted that as herein disclosed this joining ring 11 is located a slight distance below the mouth 12 of the interior receptacle so that when the cap 4 has been removed and the cork 5 withdrawn therefrom, the contents of the receptacle may be readily poured out without danger of the liquid or like containing substance flowing down on to the joining ring 11. Attention is called to the fact that the ring 11 is located below the mouth of the bottle and between the upper end of the casing and the neck portion of the bottle, the top of the ring terminating substantially at the same level as the top edge of said casing, whereby the ring is protected and the appearance of the bottle is preserved as well.

Attention is especially directed to the mouth opening 12 in that the same projects a distance beyond the neck 2 of the casing 1 and the vacuum space 9 is also carried up therewith forming an insulation interior of the packing ring 11. It will be readily apparent in receptacles having the mouth of the inner receptacles substantially flush with the packing material that a surface is exposed to the contents of the receptacle when poured out which serve as a collecting place for germs, bacteria and the like. Furthermore, this type of receptacle is very hard to sterilize properly as the heated contents are absorbed by the joining material and open crevices which cannot be efficiently cleaned. By my novel mouth opening I protect the joining from contact with the contents of the receptacle and provide a vessel which can be sterilized throughout and furthermore the vacuum extends sufficiently to form an insulation between the joining and the interior of the receptacle.

It will be readily apparent that I have devised a very novel and useful means of protecting the insulated material 7 of the bottle which has heretofore gradually become permeated with the overflow from the receptacles and its usefulness destroyed as a heat and cold retaining means.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

In a device of the character described, a double walled receptacle having a vacuum therebetween and formed with a neck portion extending upwardly to the mouth and of uniform diameter, a casing surrounding said receptacle, the upper edge of said casing terminating below the mouth of the receptacle, said vacuum extending above the said edge, and a ring located below said mouth and between the upper end of said casing and said neck portion, the top of said ring terminating substantially at the same level as the top edge of said casing.

JOHN G. LYMAN.

Witnesses:
C. D. McVay,
L. H. Brewington.